United States Patent [19]

Schneeweiss

[11] Patent Number: 4,905,577
[45] Date of Patent: Mar. 6, 1990

[54] LINE-CONTACT-TYPE SPHERICAL BEARING FOR CONNECTING PISTON TO CONNECTING ROD

[75] Inventor: Dieter Schneeweiss, Memmingen, Fed. Rep. of Germany

[73] Assignee: G. Düsterloh GmbH, Fed. Rep. of Germany

[21] Appl. No.: 263,954

[22] Filed: Oct. 26, 1988

Related U.S. Application Data

[63] Continuation of Ser. No. 67,211, Jun. 26, 1987, abandoned.

[30] Foreign Application Priority Data

Jun. 26, 1986 [DE] Fed. Rep. of Germany ....... 3621421

[51] Int. Cl.⁴ .......................... F01B 9/02; F02B 75/32
[52] U.S. Cl. ......................................... 92/158; 92/159; 92/187; 92/219; 403/125; 403/127; 384/245; 384/610
[58] Field of Search .................. 92/158, 159, 187, 188, 92/219, 259; 403/124, 125, 126, 127, 128, 122; 384/245, 610

[56] References Cited

U.S. PATENT DOCUMENTS

| | | | |
|---|---|---|---|
| 2,926,975 | 3/1960 | Karde et al. | 403/125 X |
| 2,964,365 | 12/1960 | Hausch | 403/122 |
| 3,173,344 | 3/1965 | Mongitore | 92/187 |
| 3,589,756 | 6/1971 | Pruvot | 403/124 |
| 3,667,789 | 6/1972 | McNeely et al. | 403/128 |
| 3,762,389 | 10/1973 | Malina | 92/187 |
| 4,039,056 | 8/1977 | Zankl | 403/125 X |
| 4,073,220 | 2/1978 | Guenther | 92/187 |
| 4,207,779 | 6/1980 | Papst | 92/187 |
| 4,373,428 | 2/1983 | Fricke | 92/159 |
| 4,690,038 | 9/1987 | Klie | 92/187 |

FOREIGN PATENT DOCUMENTS

| | | | |
|---|---|---|---|
| 1001756 | 8/1965 | United Kingdom | 403/126 |
| 1051638 | 1/1954 | France | 403/126 |
| 181147 | 7/1954 | Netherlands | 403/128 |

Primary Examiner—Robert E. Garrett
Assistant Examiner—George Kapsalas
Attorney, Agent, or Firm—Toren, McGeady & Associates

[57] ABSTRACT

A hydraulically-operated piston machine includes at least one cylinder and a piston axially movably guided in the cylinder. The piston is connected to a crankshaft or the like by means of a connecting rod. The connecting rod and the piston each have spherically-shaped bearing surfaces serving for connecting the connecting rod and the piston with each other in an articulated manner. The connecting rod defines at its end connected to the piston a radially outwardly facing spherical surface portion which is arranged concentrically with the spherical bearing surface of the connecting rod. The spherical surface portion rests against the surface of a recess defined in the piston, so that a hollow space is defined between the surface of the recess and the spherical surface portion. The piston defines a bore for effecting communication of fluids between the interior of the cylinder and the hollow space.

12 Claims, 2 Drawing Sheets

LINE-CONTACT-TYPE SPHERICAL BEARING FOR CONNECTING PISTON TO CONNECTING ROD

This is a continuation of Ser. No. 067,211, filed June 26, 1987, now abandoned.

BACKGROUND OF THE INVENTION

1. Field of the Invention

The present invention relates generally to piston machines or engines. The invention relates particularly to a hydraulically operated piston machine which has at least one cylinder and a piston axially movably guided in the cylinder. The piston is connected to a crankshaft or the like by means of a connecting rod. The connecting rod and the piston each have spherically-shaped bearing surfaces serving for connecting the connecting rod and the piston with each other in an articulated manner.

2. Description of the Prior Art

In known piston machines which operate in a similar manner as internal combustion engines, the force of the piston is transmitted to a piston pin onto the connecting rod and the crankshaft connected to the connecting rod. Since the connecting rod is pivotable only in one plane transversely of the axis of the piston pin, the eye of the connecting rod, i.e., the bore in the connecting rod in which the piston pin of the piston is mounted, must be arranged exactly parallel to the axis of the crankshaft in order to avoid deviations in the parallelism and, thus, canting or tilting of the piston within the cylinder. This exact arrangement is technically very difficult to obtain. Even slight deviations of the parallelism between the axis of the crankshaft and the axis of the connecting rod eye causes canting of the piston which leads to premature wear and failure of the machine.

In order to avoid these disadvantages, piston machines have been developed in which the connection between connecting rod and piston permits relative movement between piston and connecting rod in more than one axial direction, so that any deviations in parallelism can be compensated. A piston machine of this type has been disclosed in the magazine "asr. fur angewandte Antriebstechnik"[Asr. Digest for Applied Drive Technology], Vol. 10, October 1975, Page 28, Illustration 2. In this prior art embodiment, the piston force is transmitted onto the connecting rod by means of a spherical joint. The spherical joint is formed by a ball at the end of the connecting rod shaft which is supported in a corresponding spherical socket in the piston.

By using a spherical joint between the piston and the connecting rod, the above-mentioned deviations in parallelism are avoided, so that the overall manufacturing quality does not have to be as high. Thus, manufacturing the machine becomes simpler and less expensive. However, the above-described embodiment has the disadvantage that the entire force to be transmitted from piston to crankshaft must be absorbed by the spherical joint between the piston and the connecting rod. This leads to high surface pressures and, thus, to increased wear in the joint, particularly when, as in a hydrostatic piston machine, pressure medium is supplied between work cylinder and crankshaft through the connecting rod in order to relieve the load on the crankshaft and to lubricate the crankshaft.

In the above-described embodiment, the ball is flattened in the region of the center axis of the connecting rod, so that pressure medium can be conducted to an eccentric member of the crankshaft through a central bore in the piston and a subsequent duct in the connecting rod. The ball must have the flattened portion in order to ensure lubricant supply to the crankshaft in any position of the connecting rod. This flattened portion reduces the bearing surface of the spherical joint, so that the force is transmitted via a spherically annular contact zone. This results in high surface pressure and correspondingly high friction forces which substantially reduce the efficiency of the piston machine and increase the wear in the joint.

It is, therefore, the primary object of the present invention to provide a piston machine of the above-described type in which the disadvantages of the known piston machines are avoided. Specifically, with structurally simple means, a piston machine is to be provided in which the frictional forces and moments in the spherical joint between connecting rod and piston are reduced, in order to increase the efficiency of the machine and to reduce the wear in the joint.

SUMMARY OF THE INVENTION

In accordance with the present invention, the connecting rod of the piston machine of the above-described type defines at its end connected to the piston a radially outwardly facing spherical surface portion which is arranged concentrically with the spherical bearing surface of the connecting rod. The spherical surface portion rests sealingly against the surface of a recess defined in the piston, so that a hollow space is defined between the surface of the recess and the spherical surface portion. The piston defines means for effecting communication of fluids between the interior of the cylinder and the hollow space.

The above-described connection between the piston and the connecting rod results in an effective reduction of the load acting on the joint between the piston and the connecting rod because a large portion of the force to be transmitted by the piston is transmitted directly through the connecting rod. As a consequence of the means of communication of fluids between the cylinder interior and the hollow space in the piston, the pressure acting on the piston in the region of the recess is reduced because the pressure of the cylinder interior is transmitted directly onto the connecting rod without acting on the piston. The piston force to be transmitted by the joint is reduced to a residual force which is only a fraction of the total force to be transmitted onto the crankshaft.

The spherical surface portion of the connecting rod serves to seal the connecting rod relative to the recess of the piston and, thus, exclusively has a sealing purpose and not a supporting purpose. Therefore, this surface portion is not subject to significant wear. Since the pressure acting on the piston is reduced, the spherically-shaped bearing surfaces of the connecting rod and the piston may have a relatively small diameter, so that the friction forces are reduced without generating high surface pressures, as they are known in the prior art piston machines. Accordingly, the efficiency of the piston machine is increased. Moreover, the piston machine is simple and inexpensive to manufacture. The piston machine according to the invention can be used economically even for small piston diameters, for example, from about 15 mm diameter.

In accordance with an embodiment of the invention, a spherical socket is formed in the piston as well as in the connecting rod, with a support ball being placed in both sockets. In other words, two spherically-shaped bearing surfaces are provided. A first bearing surface is formed in the piston for supporting the support ball and a second bearing surface is formed in the connecting rod and supports the support ball. Thus, in this embodiment, the pivoting motion between connecting rod and piston is transmitted via two bearing surface, so that the movement within a single bearing surface is half the total movement in the ideal case. Accordingly, in this embodiment, the wear is especially low and, therefore, this embodiment can be used advantageously for highly stressed machines.

In accordance with another embodiment of the present invention, the piston defines on its side facing the connecting rod a spherically-shaped projection which is received in a spherical socket formed in the connecting rod within the end of the connecting rod defining the spherical surface portion. The side of the piston facing the interior of the cylinder may define a recess.

In accordance with yet another embodiment of the present invention, a spherical projection is formed in the end of the connecting rod defining the spherical surface portion, the spherical projection being received in a spherical socket of the piston.

The above embodiments of the piston machine according to the invention are used in accordance with the existing requirements with respect to operation and manufacture.

In an embodiment of the invention which is particularly advantageous to manufacture, the recess defined in the piston for receiving the spherical surface portion of the connecting rod is cylindrically-shaped.

The sealing contact of the spherical surface portion of the connecting rod with the cylindrical recess ensures a high sealing efficiency. In addition, the sealing effect is obtained with low friction and wear because of the linear contact of the spherical surface portion in the recess.

In order to ensure that it is possible to transmit compression forces in addition to the tensile forces between the piston and the connecting rod, the piston wall forming the recess defines an inwardly directed projection to prevent the connecting rod from moving in axial direction relative to the piston.

In accordance with another advantageous feature of the invention, the inwardly directed projection may be an annular bead or a circumferentially extending ring. This feature ensures that the spherical surface portion of the connecting rod is securely held in any pivoting position and striking of the connecting rod within the piston during load change is prevented. The annular bead is advantageously formed after inserting the connecting rod into the piston by plastically deforming the piston wall. Such a manufacture is particularly economical because no additional structural parts are required and no additional chip removing finishing of the piston must be carried out.

If it is important that the joint between piston and connecting rod is accessible, a conical ring secured by means of a spring ring may be inserted in the recess of the piston for securing the end of the connecting rod with the spherical surface portion within the piston.

In accordance with another embodiment of the invention, the spherical surface portion of the connecting rod forms a gap seal together with the cylindrical portion of the recess in the piston. This seal is virtually free of friction and wear in operation and, therefore, is particularly suitable where the connecting rod is held axially in place by means of the annular bead described above formed by a plastic deformation of the piston wall because, in this case, it is difficult or impossible to disassemble the connecting rod subsequently from the piston, for example, in order to renew a sealing member.

In accordance with another embodiment of the invention, the sealing ring may be provided, either placed in a groove formed in the spherical surface portion of the connecting rod or placed in an annular groove formed in the piston wall. Depending upon the use of the piston machine, the sealing ring may be of rubber, plastics material, metal or another suitable material. The embodiment including a sealing ring is particularly advantageous if high work pressures occur and when the piston diameter is large. When the sealing ring is arranged in the groove formed in the spherical surface portion, the outer surface of the sealing ring advantageously also is spherically-shaped. When the sealing ring is placed in the recess formed in the piston wall, the inner surface of the sealing ring preferably has a cylindrical shape, in order to ensure the sealing action in any position assumed by the connecting rod. It is, however, also possible to have the inwardly facing surface of the sealing ring spherically shaped.

In piston machines of the type described above, the joint of the connecting rod with the crankshaft or with an eccentric member of the crankshaft is supplied with lubricant and the pressure acting on this joint is reduced by means of a hydraulic medium conducted from the cylinder interior through ducts formed in the piston and in the connecting rod. In accordance with the present invention, a means for connecting the cylinder interior with the hollow space in the piston is provided for reducing the pressure on the piston. The means for communication may be a bore formed in the bottom of the piston eccentrically relative to the axis of the piston. The bore referred to above may simultaneously serve as a duct for lubricant supply if a groove is provided within the spherical bearing surface of the connecting rod which is in communication with a central duct in the connecting rod which, in turn, is in communication with the joint of the connecting rod with the crankshaft.

In accordance with another embodiment of the invention, a central bore may be provided in the piston bottom which central bore is in direct communication with the central duct formed in the connecting rod. However, in this case, the duct within the connecting rod must have such a diameter, or the ends of the bore in the piston bottom and of the duct in the connecting rod must have such a size, that communication between the bore and the duct is ensured in any position of the connecting rod.

The end of the connecting rod facing away from the piston has a shoe-type member which defines a bearing surface for the crankshaft. The central duct in the connecting rod opens to this bearing surface. As a result, the lubrication of the connecting rod joint with the crankshaft is ensured. In addition, the pressure of the connecting rod shoe acting on the eccentric member of the crankshaft is reduced. With increasing load of the connecting rod acting on the eccentric member, the pressure of the work medium within the bearing surface also increases, so that the friction in the joint is kept within tolerable limits.

The piston machine in accordance with the invention has a higher efficiency than the known machines of this type, because friction forces between piston and connecting rod are reduced significantly by the pressure acting directly on the connecting rod. The piston machine according to the invention is simple to manufacture because no extreme tolerance requirements exist. The initially mentioned error in parallelism between connecting rod eye and crankshaft axis does not occur. Inaccuracies in manufacture are compensated by the spherical joint between piston and connecting rod. The arrangement according to the invention is economical for machines having piston diameters of greater than 20 mm. The invention can be used in various types of hydraulic piston machines, for example, piston machines having adjustable swash plate shafts.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
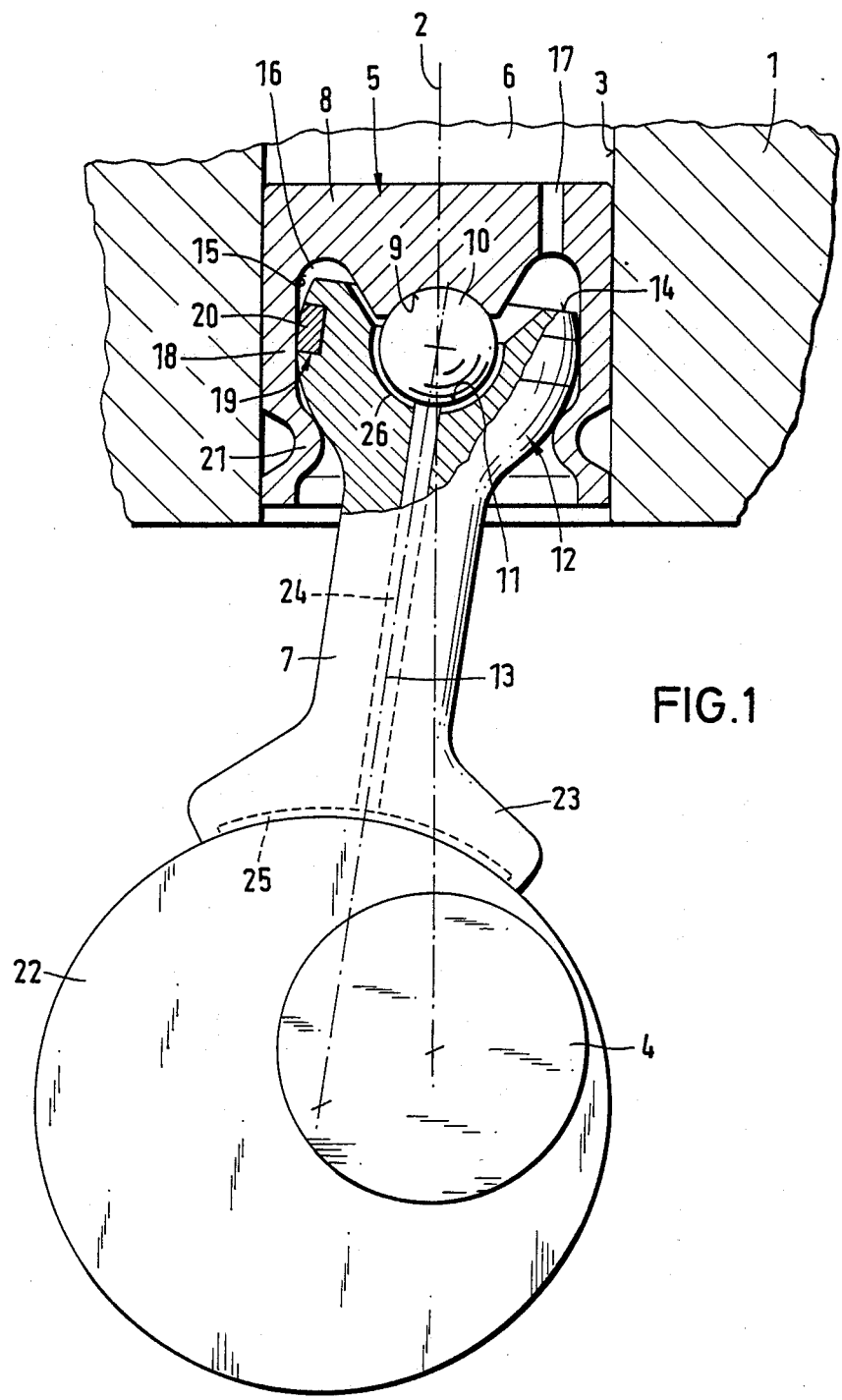
FIG. 1 is a schematic sectional view of a cylinder and a piston of a hydraulically- operated radial piston machine and a connecting rod resting against an eccentric member of a crankshaft.
Figure 2:
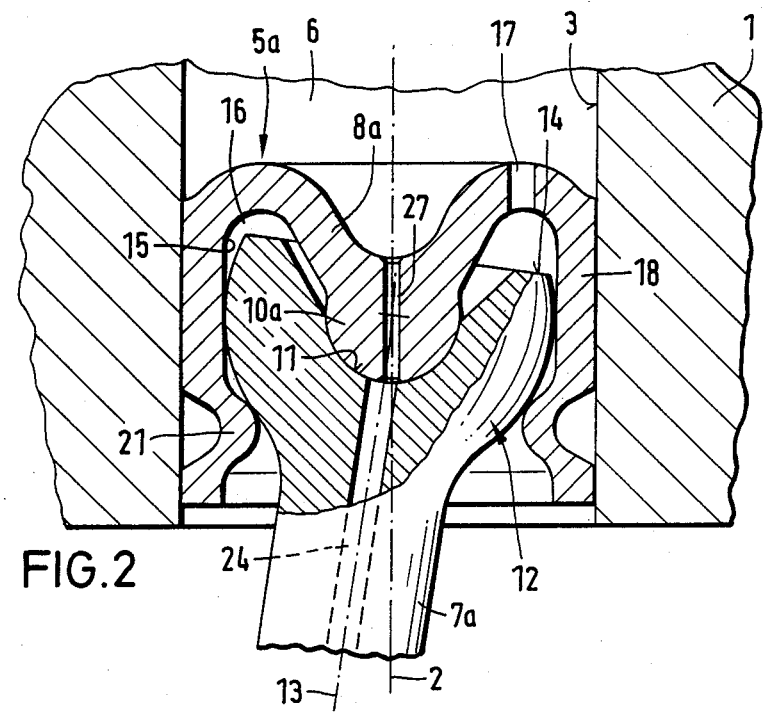
FIG. 2 is a schematic sectional view, on a larger scale, of a second embodiment of the joint of the connecting rod with a piston of a hydraulically- operated radial piston machine.
Figure 3:
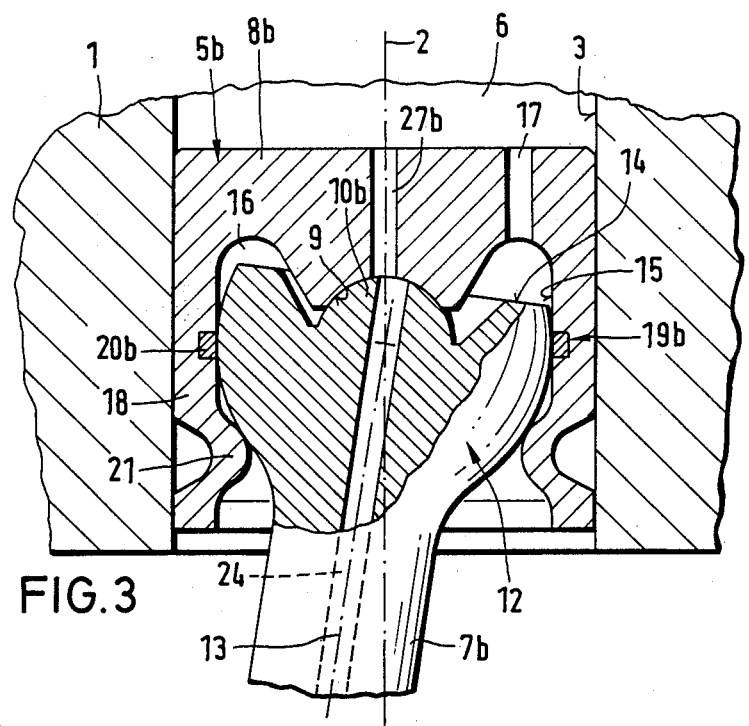
FIG. 3 is a schematic sectional view, on yet a larger scale, of a third embodiment of the joint between a connecting rod with a piston.

As illustrated in FIGS. 1 through 3 of the drawing, a hydraulically-operated radial piston machine includes a cylinder 3 arranged radially relative to a crankshaft 4. The machine has a plurality of cylinders arranged next to each other. Each Figure of the drawing shows a machine housing 1 in a sectional view taken in the region of cylinder axis 2. Corresponding parts are denoted in the Figures of the drawing with the same reference numerals.

The embodiment of the invention illustrated in FIG. 1 includes a machine housing 1 which defines a cylindrical bore or cylinder 3. A crankshaft 4 is arranged extending perpendicularly of the cylinder axis 2. Cylinder 3 is open toward crankshaft 4. A piston 5 is guided in cylinder 3 so as to be movable in the direction of cylinder axis 2. On the side of the piston 5 facing away from the crankshaft 4, cylinder 3 defines a cylinder interior 6 into which hydraulic liquid can be admitted. Cylinder interior 6 is the actual work space of the machine.

Piston 5 is approximately cup-shaped in cross-section and is supported through a connecting rod 7 by an eccentric member 22 forming part of crankshaft 4. Piston 5 has a piston bottom 8 which, in turn, defines a spherical socket 9 which is open toward connecting rod 7. A support ball 10 is placed in spherical socket 9. Support ball 10 is further supported in a spherical socket 11 which is provided opposite spherical socket 9 on the piston end of the connecting rod 7. Thus, connecting rod 7 is pivotable in all directions about the center of the ball. Advantageously, the center of the ball is located on the cylinder and piston axis 2.

The end of the connecting rod 7 facing piston 5 defines a spherical surface portion 12 which surrounds spherical socket 11 and is located symmetrically relative to longitudinal axis 13 of connecting rod 7. Spherical surface portion 12 socket 9 in piston 5. Spherical surface portion 12 is arranged concentrically relative to support ball 10 and spherical socket 11. Spherical socket 11 is formed by a recess defined in the piston end of spherical surface portion 12. The rim of spherical socket 11 is conically outwardly widened and ends in a flat end face 14 of connecting rod 7 or spherical surface portion 12 facing piston bottom 8. The outer edge of the end face 14 forms the transition to the spherical surface portion 12 whose diameter increases away from end face 14 and, after reaching its full diameter, the diameter decreases to the diameter of connecting rod 7.

Spherical surface portion 12 of connecting rod 7 rests sealingly against a recess 15 formed in piston 5. This recess 15 is cylindrical at least in the region of spherical surface portion 12. The sealing contact of the spherical surface portion 12 against the inner side of recess 15 forms a hollow space 16 between piston 5 and spherical surface portion 12. Hollow space 16 is in communication through a bore 17 in the piston bottom 8 with the cylinder interior 6. Bore 17 is arranged eccentrically relative to cylinder axis 2. As a result of bore 17, the same pressure exists in hollow space 16 as in cylinder interior 6, so that the force acting on piston 5 is substantially reduced. Since pressure acts on the piston bottom 8 from both sides of the entire cross-sectional area of spherical surface portion 12, only a residual force acts on the piston 5, this residual force being computed as follows:

$$(1)\ F_{Res} = \pi/4\ (D^2 - d^2) \cdot p$$

wherein
  $D$ = piston diameter,
  $F_{Res}$ = the force acting on piston 5 (residual force),
  $d$ = diameter of cylindrical recess 15,
  $p$ = pressure in cylinder interior 6.

The remaining force acting in the direction toward the crankshaft 4 is not exerted by piston 5, but directly by connecting rod 7 as follows:

$$(2)\ F_{P1} = \pi/4\ d^2 \cdot p$$

wherein
  $F_{P1}$ = the force acting directly on connecting rod 7.

By way of clarification, the force to be transmitted to the piston in known machines of this type is indicated below:

$$(3)\ F = F_{Res} + F_{P1}$$

Since a large portion of the force is transmitted directly to the crankshaft 4 through connecting rod 7 without acting on piston 5, only small forces must be absorbed by spherical joint 9, 10, 11. As a result, the surface pressure within this joint 9, 10, 11 and, thus, the frictional losses are substantially reduced which leads to a higher efficiency and a longer service life of the machine. As subsequent computations have shown, compared to conventional machines with spherical pivot joints, the surface pressure in the spherical contact surface has been reduced by more than 30%, so that the diameter of the spherical bearing surfaces can be kept relatively small in order to reduce the friction radius.

As described above, the spherically shaped contact surfaces 9, 10, 11 serve to guide the force-transmitting connecting rod 7 in piston 5. The spherical surface portion 12, on the other hand, is exclusively provided for obtaining the sealing contact of the end of the connecting rod 7 in recess 15 of piston 5. In the embodiment illustrated in FIG. 1, spherical surface portion 12 has an annular groove 19 arranged concentrically to the longitudinal axis 13 of connecting rod 7. A sealing ring 20 is placed in annular groove 19. In the embodiment illustrated in FIG. 1, spherical surface portion 12 has an annular groove 19 arranged concentrically to the longitudinal axis 13 of connecting rod 7. A sealing ring 20 is placed in annular groove 19. Sealing ring 20 has a spherically-shaped outer surface which bears sealingly against recess 15. Sealing ring 20 may be a type of piston ring or may be a part of rubber, plastics material or metal.

Instead of a sealing ring 20 placed in annular groove 19, it is also possible to provide an annular groove 19b in piston wall 18 and to place a sealing ring 20b in annular groove 19b, as illustrated in FIG. 3. In this case, the inner surface of sealing ring 20b has a cylindrical shape in order to seal relative to spherical surface portion 12.

Instead of providing a sealing ring, a gap may exist between recess 15 and spherical surface portion 12, i.e., a so-called gap seal, as illustrated in FIG. 2. This type of seal provides the advantage of a contact-free operation, so that wear and friction are low. Since, in this case, leakages occur, the so-called gap seal is advantageous in machines using small work pressures in cylinder space 6 and having small piston diameters.

In order to avoid that connecting rod 7 lifts off from piston 5, an annular bead 21 is provided in piston wall 18 in all illustrated embodiments. Annular bead 21 reduces the diameter of recess 15 at the end of piston 5 facing the crankshaft, so that the spherical surface portion 12 of connecting rod 7 is positively held within recess 15. Annular bead 21 is manufactured by a plastic deformation of the piston wall 18 after the spherical surface portion 12 of connecting rod 7 has been inserted together with support ball 10 in the embodiment according to FIG. 1.

As illustrated in FIG. 1, a shoe-type member 23 formed at the crankshaft end of connecting rod 7 rests slidingly against the outer circumference of an eccentric member 22. For reducing pressure and for lubricating purposes, the contact surface of shoe 23 has a recess 25 which is in communication through a central duct 24 in connecting rod 7 extending axially to connecting rod axis 13 and a groove 26 in spherical socket 11 with hollow space 16 and, thus, with cylinder interior 6. As a result, when pressure increases in cylinder interior 6, i.e., the force to be transmitted by connecting rod 7 onto eccentric member 22 also increases, a correspondingly higher lubricant pressure exists between connecting rod shoe 23 and eccentric member 22. The resulting higher hydrostatic pressure ensures that the higher force can be transmitted with low friction.

In the embodiment illustrated in FIG. 1, the work medium is conducted from the cylinder interior 6 through bore 17 into hollow space 16, subsequently through groove 26 into spherical socket 11 and the opening of duct 24. In this embodiment, the hydrostatic support between eccentric member 22 and connecting rod 7 is a floating support, i.e., connecting rod 7 rests against eccentric member 22. The support can also be obtained by means of a connecting rod which is rigidly connected through a connecting rod eye through a crankshaft.

In the embodiment illustrated in FIG. 2, connecting rod 7a defines a spherical surface portion 12 essentially in the same manner as in FIG. 1. However, the joint between the piston 5a and connecting rod 7a differs in that a spherical projection 10a facing the crankshaft 4 is formed in piston bottom 8a. In the same manner as support ball 10 in FIG. 1, spherical projection 10a is surrounded by the end of connecting rod 7a forming the spherical surface portion 12. The manner of operation, particularly with respect to the distribution of forces onto piston 5a and connecting rod 7a, is the same as described above in connection with the embodiment of FIG. 1. As the cross-sectional view of FIG. 2 shows, the piston bottom 8a is not plane toward the cylinder interior 6, but is downwardly inclined toward the edge and toward the center thereof.

FIG. 2 further illustrates an alternative lubricant supply through a central bore 27 formed in piston bottom 8a. Bore 27 is in direct communication with ducts 24 of connecting rod 7a. It should be mentioned that duct 24 and bore 27 must have sufficiently large diameters in order to ensure communication between duct 24 and bore 27 even when pivoting movements of connecting rod 7a relative to projection 10a are performed, so that lubricant continues to be supplied to the joint between connecting rod 7a and eccentric member 22. However, if duct 24 and bore 27 have small diameters, this communication can also be obtained by widening the openings of duct 24 and of bore 27 where they face each other.

In the embodiment illustrated in FIG. 3, piston 5b is essentially of the same shape as in FIG. 1, i.e., a spherical socket 9 is formed in the piston bottom 8b facing the crankshaft 4. Connecting rod 7b has a spherical projection 19b which is received in spherical socket 9 of piston 5b. The manner of operation with respect to the distribution of forces between piston rod 7 and connecting rod 7b is the same as described above. As in the embodiments described above, spherical surface portion 12 is arranged concentrically relative to the spherical bearing surfaces 9, 10b and merely assumes a sealing function relative to piston 5b. Connecting rod 7b is guided within piston 5b by means of the spherical projection 10b and the spherical socket 10.

The lubricant supply is similar to that described with respect to FIG. 2, i.e., a central bore 27b in piston bottom 8b is in communication with duct 24 coaxially formed in connecting rod 7b.

While specific embodiments of the invention have been shown and described in detail to illustrate the application of the inventive principles, it will be understood that the invention may be embodied otherwise without departing from such principles.

I claim:

1. A piston machine, comprising at least one cylinder having a longitudinal axis, a piston axially movably guided in the cylinder, a connecting rod connecting the piston to a crankshaft, the connecting rod and the piston each defining spherically-shaped bearing surfaces for connecting the connecting rod and the piston with each other in an articulated manner, the connecting rod defining a radially outwardly facing spherical surface portion which is arranged concentrically with the spherically-shaped bearing surface of the connecting rod, the piston having a piston wall and a bottom, the piston wall and the bottom defining a recess, the end of the connecting rod facing the piston being sealingly received in the recess, the surface of the recess and the spherical surface portion of the connecting rod defining a hollow space, and the piston bottom defining a bore for effecting communication of fluids between the interior of the cylinder and the hollow space, wherein the piston wall has an inwardly facing projection, the projection serving to positively lock the spherical surface portion of the connecting rod in the recess, and wherein the piston wall defining the recess is cylindrically-shaped, the cylindrically-shaped piston wall extending in axial direction essentially over the entire axial length of the area of the spherical surface portion of the connecting rod, so that contact exists between the cylindrically-shaped piston wall and the spherical surface portion along a line of contact.

2. The piston machine according to claim 1, wherein the machine is hydraulically operated.

3. The piston machine according to claim 1, wherein the spherical bearing surfaces of the piston and of the connecting rod are spherical sockets, a support ball being received by the spherical sockets.

4. The piston machine according to claim 1, wherein the spherical bearing surface of the piston is defined by a projection formed in the piston facing the connecting rod, the spherical bearing surface of the connecting rod receiving the projection.

5. The piston machine according to claim 1, wherein the spherical bearing surface of the connecting rod is formed by a projection in the connecting rod facing the piston, the projection being received in the spherical bearing surface of the piston.

6. The piston machine according to claim 1, wherein the projection is an annular bead.

7. The piston machine according to claim 1, wherein a sealing gap exists between the spherical surface portion of the connecting rod and the cylindrical surface of the recess.

8. The piston machine according to claim 1, wherein the spherical surface portion of the connecting rod defines an annular groove, a sealing ring placed in the annular groove, the outer surface of the sealing ring contacting the piston wall having a spherical shape.

9. The piston machine according to claim 1, wherein the cylindrical surface of the recess of the piston defines an annular groove, a sealing ring placed in the annular groove, the sealing ring having on its surface facing the cylindrical surface portion of the connecting rod a cylindrical shape.

10. The piston machine according to claim 1, wherein the bore in the piston bottom is located eccentrically relative to the axis.

11. The piston machine according to claim 1, wherein the connecting rod has a second end spaced from the end facing the piston, the second end forming a piston rod shoe adapted for connection with an eccentric member forming part of a crankshaft, the spherical bearing surface of the connecting rod defining a groove, the connecting rod defining a central duct, and the piston rod shoe defining a recess, so that lubricant can be communicated between the interior of the cylinder and the piston rod shoe through the groove in the spherical bearing surface of the piston rod, the central duct in the connecting rod and the recess in the piston rod shoe.

12. The piston machine according to claim 1, wherein the connecting rod has a second end spaced from the end facing the piston, the second end forming a piston rod shoe adapted for connection with an eccentric member forming part of a crankshaft, the piston bottom defining an axial bore, the connecting rod defining a central duct, and the piston rod shoe defining a recess, so that lubricant can be communicated between the interior of the cylinder and the piston rod shoe through the axial bore in the piston bottom, the duct in the connecting rod and the recess in the piston rod shoe.

* * * * *